United States Patent
Kumar et al.

(10) Patent No.: US 11,531,612 B2
(45) Date of Patent: Dec. 20, 2022

(54) METHODS FOR PROVIDING AN ENTERPRISE SYNTHETIC MONITORING FRAMEWORK

(71) Applicant: JPMorgan Chase Bank, N.A., New York, NY (US)

(72) Inventors: Vishal Kumar, Kennett Square, PA (US); Phani S. Kumar, Hyderabad (IN); Bhaskar Parsi, Delaware, OH (US); Rohan Reddy Alluri, Wilmington, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 165 days.

(21) Appl. No.: 16/441,635

(22) Filed: Jun. 14, 2019

(65) Prior Publication Data
US 2019/0384691 A1 Dec. 19, 2019

Related U.S. Application Data

(60) Provisional application No. 62/864,808, filed on Jun. 14, 2018.

(51) Int. Cl.
*G06F 11/36* (2006.01)

(52) U.S. Cl.
CPC ................ *G06F 11/3612* (2013.01)

(58) Field of Classification Search
CPC ...... G06F 11/3612–3616; G06F 11/362–3624; G06F 11/3636–364; G06F 11/366; G06F 11/36–3696
See application file for complete search history.

(56) References Cited

U.S. PATENT DOCUMENTS

| | | | |
|---|---|---|---|
| 8,510,716 B1 * | 8/2013 | Jakubiak | G06F 11/3672 714/45 |
| 2006/0156072 A1 * | 7/2006 | Khot | G06F 11/3612 714/47.2 |
| 2012/0069748 A1 * | 3/2012 | Van Den Bogaert | H04W 24/10 370/252 |
| 2012/0226940 A1 * | 9/2012 | Lin | G06F 11/263 714/26 |
| 2016/0085666 A1 * | 3/2016 | Jordan | H04L 67/42 714/38.1 |

(Continued)

OTHER PUBLICATIONS

Willnecket et al., "Using Dynatrace Monitoring Data for Generating Performance Models of Java EE Applications", published by ACM, ICPE'15, Jan. 31-Feb. 4, 2015, pp. 103-104 (Year: 2015).*

(Continued)

*Primary Examiner* — S. Sough
*Assistant Examiner* — Zheng Wei
(74) *Attorney, Agent, or Firm* — Greenblum & Bernstein, P.L.C.

(57) ABSTRACT

Embodiments disclosed herein provide for methods and systems for providing an enterprise synthetic monitoring framework, wherein the enterprise synthetic monitoring framework is configured to provide exhaustive end-to-end monitoring for a variety of applications and workflows including those that are browser and non-browser based, those that are implemented on mobile devices, and those that are implemented utilizing native protocols.

15 Claims, 8 Drawing Sheets

(56) References Cited

U.S. PATENT DOCUMENTS

| | | | | |
|---|---|---|---|---|
| 2016/0259714 | A1* | 9/2016 | Shor | G06F 11/3676 |
| 2016/0314056 | A1* | 10/2016 | Greene | G06F 11/3664 |
| 2016/0357516 | A1* | 12/2016 | Kogel | G06F 11/3612 |
| 2017/0024305 | A1* | 1/2017 | Betser | G06F 11/3672 |
| 2017/0075714 | A1* | 3/2017 | Bhide | G06F 11/328 |
| 2017/0220452 | A1* | 8/2017 | Ren | G06F 11/3688 |
| 2018/0081777 | A1* | 3/2018 | Sayre | G06F 11/3612 |
| 2019/0005234 | A1* | 1/2019 | Klonowski | G06F 11/3466 |
| 2019/0324946 | A1* | 10/2019 | Bingham | G06F 17/40 |

OTHER PUBLICATIONS

Van Hoorn et al., "Continuous Monitoring of Software Services: Design and Application of the Kieker Framework", published by Department of Computer Science, University of Kiel, Germany. Report No. TR-0921, pp. 1-27 (Year: 2009).*

* cited by examiner

| | CHARACTERISTICS | | | | | | |
|---|---|---|---|---|---|---|---|
| | Diagnostics (Capable of correlating Tier level Diagnostics Metrics) | DevOps (Can the Capability be delivered to Ad for deployment) | Cloud Capable (Capable of Monitoring Cloud Based Apps) | Platform Roadmap (Capability/Tool deployed to cloud/ on prem or GTI aligned) | Browser Roadmap (What all browsers and versions are supported) | Visualization (Metrics collection via Dashboard/Report) | Events/ Alerting (Alerting mechanism for failures/SLA breaches) | API (Can the metrics be pulled via API) |
| Browser Based Internal Apps | | | | | | | | |
| Browser Based External Apps | | | | | | | | |
| Mobile Apps (iOS/Android) | | | | | | | | |
| Non Browser (REST/SOAP/ API/ Thick Client) Calls | | | | | | | | |
| Web URL's Only (Health check) | | | | | | | | |
| IVR | | | | | | | | |

CAPABILITY

FIG. 7

Execution Results for Monday, September 18, 2017

Mortgage Banking | Consumer & Business Banking | Internal Applications

M1 - Scheduled Run Details (14:00 - 02:29)

| # | Test Case | Status | Latest Run Start Time | End Time | Duration | Previous Run Start Time | Status |
|---|---|---|---|---|---|---|---|
| 1 | M1 – FastPay | ✓ | 14:16:18 | 14:16:41 | 23 secs | 14:01:23 | ✓ |
| 2 | M1 - INDEX_CAAMN40_wspht3 | ✓ | 14:16:06 | 14:16:22 | 17 secs | 14:01:10 | ✓ |
| 3 | M1 - INDEX_CAAM250_JBOC | ✓ | 14:28:06 | 14:28:23 | 17 secs | 14:13:05 | ✓ |
| 4 | M1 - INDEX_KYC_wspht9 | ✓ | 14:28:06 | 14:28:23 | 17 secs | 14:13:05 | ✓ |
| 5 | M1 - INDEX_KYC_wspht3 | ✓ | 14:28:06 | 14:28:23 | 17 secs | 14:13:05 | ✓ |
| 6 | M1 - INDEX_KYC_wspht2 | ✓ | 14:28:06 | 14:28:23 | 17 secs | 14:13:06 | ✓ |
| 7 | M1 - INDEX_KYC_MBOC | ✓ | 14:06:06 | 14:16:23 | 17 secs | 14:01:10 | ✓ |
| 8 | M1 - INDEX_KYC_JBOC | ✓ | 14:28:06 | 14:16:23 | 17 secs | 14:01:10 | ✓ |
| 9 | M1 - INDEX_CAAMS10_wspht2 | ✓ | 14:28:06 | 14:16:23 | 17 secs | 14:01:10 | ✓ |
| 10 | M1 - INDEX_CAAMS10_wspht2 | ✓ | 14:28:06 | 14:16:23 | 17 secs | 14:01:10 | ✓ |
| 11 | M1 - BDSSEZD_LB | ✓ | 14:16:14 | 14:16:41 | 27 secs | 14:01:26 | ✓ |
| 12 | M1 - BDSSEZD_CDC1 | ✓ | 14:16:11 | 14:16:38 | 27 secs | 14:01:16 | ✓ |
| 13 | M1 - BDSSEZD_BEL | ✓ | 14:16:18 | 14:16:47 | 29 secs | 14:01:23 | ✓ |
| 14 | M1 - ACES_PROD_QA | ✓ | 14:16:20 | 14:16:42 | 23 secs | 14:01:28 | ✓ |
| 15 | M1 - ACES_PROD_FLR | ✓ | 14:16:37 | 17:17:00 | 23 secs | 14:01:34 | ✓ |
| 16 | M1 - ACES_PROD_HAMP | ✓ | 14:16:31 | 14:16:54 | 23 secs | 14:01:39 | ✓ |
| 17 | M1 - ACES_PROD_SOA | ✓ | 14:16:14 | 14:16:36 | 23 secs | 14:01:17 | ✓ |
| 18 | M1 - Solomon_GL_FCL_BID | ✓ | 14:28:14 | 14:29:34 | 1.35 mins | 14:13:10 | ✓ |
| 19 | M1 - CMTT | ✓ | 14:16:11 | 14:16:57 | 46 secs | 14:01:19 | ✓ |
| 20 | M1 - LISA | ✗ | 14:16:15 | 14:16:50 | 36 secs | 14:01:15 | ✓ |
| 21 | M1 - LoanTrack | ✓ | 14:28:15 | 14:29:22 | 1.13 mins | 14:13:14 | ✗ |
| 22 | M1 - GBDTWeb | ✓ | 14:28:11 | 14:29:07 | 57 secs | 14:13:13 | ✓ |
| 23 | M1 - SPOC | ✓ | 14:28:11 | 14:28:38 | 27 secs | 14:13:11 | ✓ |
| 24 | M1 - Gallus | ✓ | 14:16:10 | 14:18:29 | 2.33 mins | 14:01:14 | ✓ |

M2 - Scheduled Run Details (14:00 - 02:29)

| # | Test Case | Status | Latest Run Start Time | End Time | Duration | Previous Run Start Time | Status |
|---|---|---|---|---|---|---|---|
| 1 | M2 - INDEX_CAAMN40_wpsht2 | ✓ | 14:14:06 | 14:14:22 | 17 secs | 14:04:05 | ✓ |
| 2 | M2 - INDEX_CAAMN30_wpsht2 | ✓ | 14:14:06 | 14:14:22 | 17 secs | 14:04:05 | ✓ |
| 3 | M2 - INDEX_CAAM960_wspht2 | ✗ | 14:14:06 | 14:14:22 | 17 secs | 14:04:05 | ✗ |
| 4 | M2 - VFM | ✓ | 14:14:14 | 14:18:29 | 4.25 mins | 14:04:18 | ✓ |
| 5 | M2 - EMTS_Commons | ✓ | 14:14:14 | 14:14:44 | 30 secs | 14:04:14 | ✓ |
| 6 | M2 - EMTS_Retail | ✓ | 14:14:17 | 14:14:51 | 34 secs | 14:04:18 | ✓ |
| 7 | M2 - Icat | ✗ | 14:14:10 | 14:14:54 | 44 secs | 14:04:21 | ✓ |
| 8 | M2 - ACES_PROD_DQA | ✓ | 14:14:13 | 14:14:35 | 22 secs | 14:04:28 | ✓ |
| 9 | M2 - ACES_DR_QA | ✓ | 14:14:18 | 14:14:41 | 23 secs | 14:04:18 | ✓ |
| 10 | M2 - ACES_DR_FLR | ✓ | 14:14:24 | 14:14:47 | 23 secs | 14:04:12 | ✓ |
| 11 | M2 - ACES_DR_SOA | ✓ | 14:14:29 | 14:14:52 | 23 secs | 14:04:23 | ✓ |
| 12 | M2 - LAD | ✗ | 14:14:11 | 14:18:14 | 4.07 mins | 14:04:17 | ✓ |
| 13 | M2 - ClosingDesk_WebServ... | ✓ | 14:14:17 | 14:14:34 | 17 secs | 14:04:14 | ✓ |
| 14 | M2 - SmartApp | ✗ | 14:14:10 | 14:15:17 | 1.12 mins | 14:04:10 | ✗ |
| 15 | M2 - AgentDesktop | ✓ | 14:14:14 | 14:14:38 | 25 secs | 14:04:10 | ✓ |
| 16 | M2 - FDS | ✗ | 14:14:21 | 14:18:41 | 4.33 mins | 14:04:10 | ✗ |
| 17 | M2 - SFR | ✓ | 14:14:18 | 14:14:40 | 22 secs | 14:04:14 | ✓ |

Select a date and execution time

September 2017

| Su | Mo | Tu | We | Th | Fr | Sa |
|---|---|---|---|---|---|---|
| 27 | 28 | 29 | 30 | 31 | 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 | 23 |
| 24 | 25 | 26 | 27 | 28 | 29 | 30 |
| 1 | 2 | 3 | 4 | 5 | 6 | 7 |

Scheduled Runs

✗ 00:00   ✗ 00:30   ✗ 01:00   ✗ 01:30
✗ 02:00   ✗ 02:30   ✗ 03:00   ✗ 03:30
✗ 04:00   ✗ 04:30   ✗ 05:00   ✗ 05:30
✗ 06:00   ✗ 06:30   ✗ 07:00   ✗ 07:30
✗ 08:00   ✗ 08:30   ✗ 09:00   ✗ 09:30
✗ 10:00   ✗ 10:30   ✗ 11:00   ✗ 11:30
✗ 12:00   ✗ 12:30   ✗ 13:00   ✗ 13:30
✗ 14:00   ✗ 14:30

On-Demand Runs

✓ 09:30   ✓ 13:15

✗ – indicates a run-window with FAILED

FIG. 8

METHODS FOR PROVIDING AN ENTERPRISE SYNTHETIC MONITORING FRAMEWORK

CROSS-REFERENCE TO RELATED APPLICATION

This application claims priority to U.S. Provisional Patent Application No. 62/684,808, filed on Jun. 14, 2018, the complete disclosure of which is hereby incorporated by reference, in its entirety.

FIELD OF THE INVENTION

The present disclosure generally relates to information processing, and more particularly to systems and methods for providing an enterprise synthetic monitoring framework.

BACKGROUND OF THE INVENTION

In the current marketplace, there is no framework that provides synthetic monitoring capability for all types of applications (e.g., browser-based, non-browser-based, mobile applications, web URL and service-level (e.g., middleware) calls) together in a unified framework. Further, there is no tool that seamlessly integrates synthetic monitoring with analytics engines, such as Splunk, and application performance monitoring ("APM") tools, such as Dynatrace, to provide deep insights (e.g., analytical as well as waterfall flow of the calls) and instant feedback on the synthetic transactions. Even further, tools for synthetic monitoring of software applications in a network are unstable and further are prone to frequent failures. Additionally, there is no synthetic monitoring process that determines real browser metrics as well as non-browser metrics under one framework.

Accordingly, there is a need for a system and method that could overcome these and other deficiencies described above.

SUMMARY OF THE INVENTION

One aspect of the present disclosure relates to providing systems and methods for providing an enterprise synthetic monitoring framework.

According to an embodiment, a system for providing an enterprise synthetic monitoring framework can include: (i) a client device, wherein the client device is configured to generate one or more synthetic monitoring requests; (ii) an information processing apparatus comprising at least one computer processor, wherein the information processing apparatus is configured to: receive the one or more synthetic monitoring requests from the client device; execute one or more workflows synthetically based on the received one or more synthetic monitoring request; identify one or more types of parameters in the executed one or more workflows; monitor the identified one or more types of parameters; send the monitored one or more types of parameters to one or more performance identification and analytics tools; receive analytics data and performance data associated with the monitored one or more types of parameters from the one or more performance identification and analytics tools; correlate the received analytics data and performance data; and determine one or more application performance events based on the correlation; and (iii) one or more server devices, wherein the one or more server devices are configured to implement the one or more performance identification and analytics tools.

According to an embodiment, a method for providing an enterprise synthetic monitoring framework can include, in an information processing apparatus comprising at least one computer processor: receiving one or more synthetic monitoring requests from a client device; executing one or more workflows synthetically based on the received one or more synthetic monitoring request; identifying one or more types of parameters in the executed one or more workflows; monitoring the identified one or more types of parameters; sending the monitored one or more types of parameters to one or more performance identification and analytics tools; receiving analytics data and performance data associated with the monitored one or more types of parameters from the one or more performance identification and analytics tools; correlating the received analytics data and performance data; and determining one or more application performance events based on the correlation.

According to an embodiment, the enterprise synthetic monitoring framework can provide the following advantages: (i) an on-demand feature for command center and L2 support, allowing for all synthetic workflows to be run ad hoc, (ii) the enterprise synthetic monitoring framework can be implemented with open source components, (iii) the enterprise synthetic monitoring framework can implement pro-active (as opposed to passive) monitoring twenty-four hours a day, seven days a week, allowing for a robust synthetic monitoring which delivers key application performance metrics in the absence of real users during off hours, and (iv) an exhaustive end-to-end monitoring for all types of applications and workflows (e.g., all browsers, iOS and Android mobile devices, APIs, Citrix, Flex, RTE, and other native protocols).

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 8 illustrates an exemplary user interface according to an embodiment of the present invention.

DETAILED DESCRIPTION OF PREFERRED EMBODIMENTS

Embodiments are directed to a consolidated framework that may utilize several source technologies (e.g., Selenium, Appium, Jenkins, etc.) and vendor tools to deliver a one-stop shop for all production synthetic monitoring needs. For example, embodiments may use a Selenium framework (open source) as the engine to drive synthetic monitoring for browser-based applications. For non-browser-based synthetic monitoring (e.g., SOAP or API calls), it may use native C# code. For some typical protocols like Citrix, Flex and RTE, it may use VUGen as the engine and for mobile synthetic monitoring, it may use Appium (open source) as the engine.

Embodiments may use a dashboard 1331 (e.g., written in C# and .NET) that may capture data and screenshots of all pages that are executed by scheduled runs. Embodiments may be integrated with Splunk and Dynatrace for analytics and end-to-end diagnostics, respectively.

Figure 1:
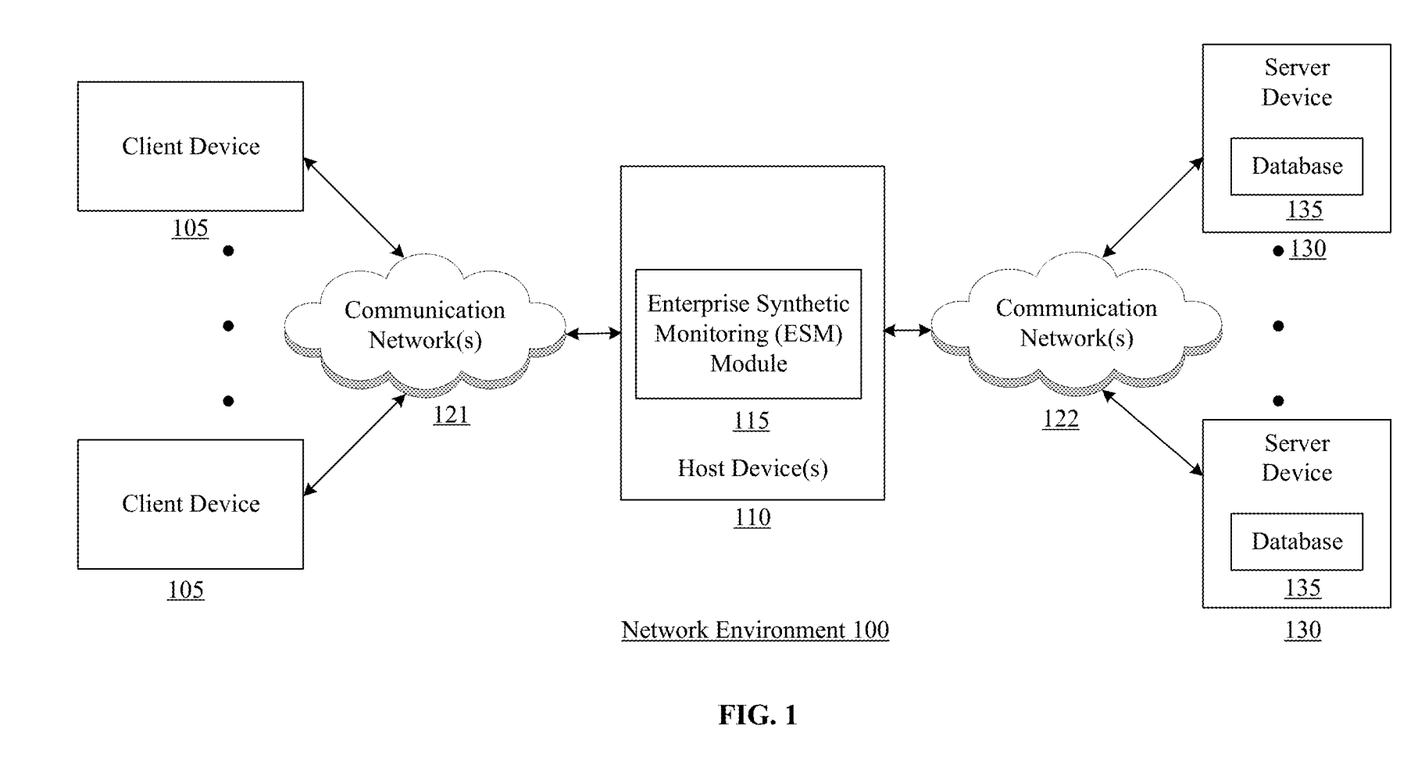
FIG. 1 illustrates an exemplary network environment according to an embodiment of the present invention.

Referring to FIG. 1, an exemplary network environment is illustrated. The enterprise synthetic module (ESM) module 115 may be executed by a host device 110 (e.g., a server) and may be coupled to a plurality of server devices 130, hosting databases 135, and a plurality of client devices 105 via communication network(s) 121 and 122; although the ESM module 115, server devices 130, and/or client devices 105 may be coupled together via other topologies. Additionally, the network environment 100 may include other network devices such as one or more routers and/or switches, for example, which are well known in the art and thus will not be described herein. The ESM module 115 may synthetically monitor application performance to facilitate improving network application performance.

Figure 2:
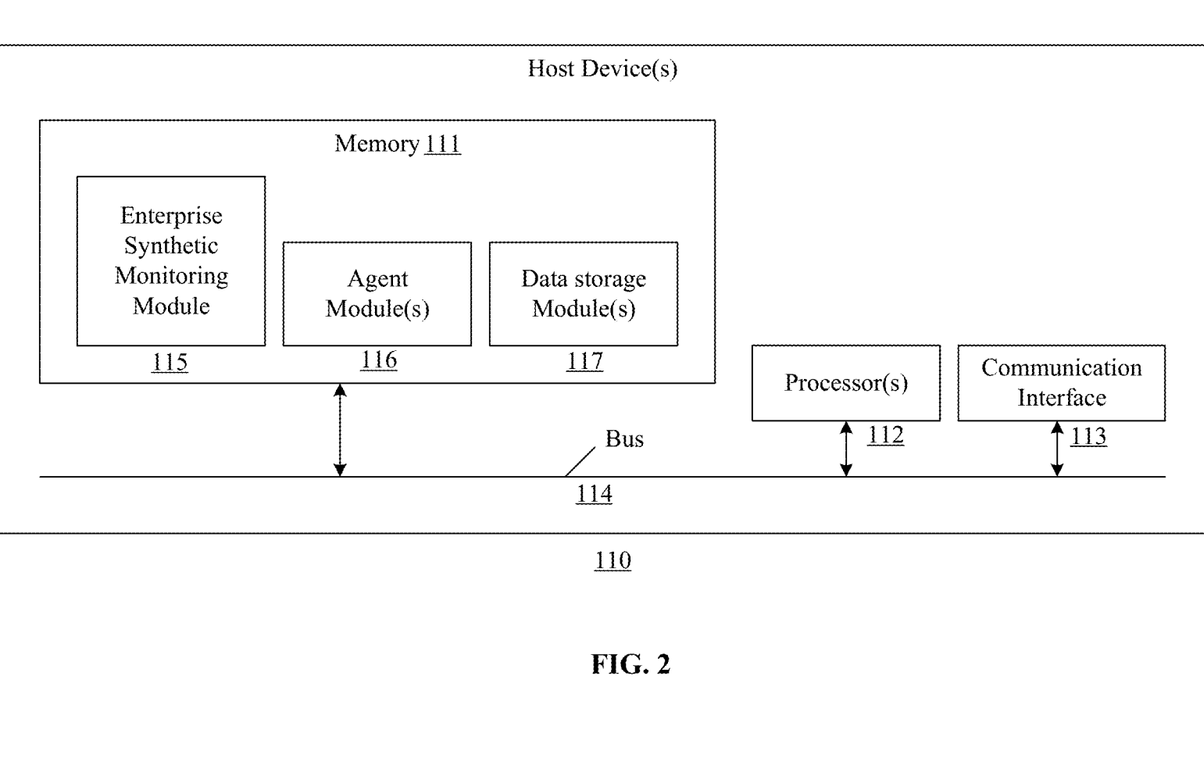
FIG. 2 illustrates an exemplary hosting device according to an embodiment of the present invention.

Referring to FIGS. 1-2, the ESM module 115 may be one or more of a computer program, application, operating system extension, plugin, etc. that is executed by a host device 110 (e.g., a backend server, a cloud-based server, etc.) that includes one or more processors 112, a memory 111, and/or a communication interface 113, which are coupled together by a bus 114 or other communication link, although the host device 110 may include other types and/or numbers of elements in other configurations. The processor(s) 112 of the host device 110 may execute programmed instructions stored in the memory 111 for any number of the functions described and illustrated herein. The processor(s) 112 may include one or more CPUs or general purpose processors with one or more processing cores, for example, although other types of processor(s) can also be used.

In this particular example, the ESM module 115 may further include or call an agent module 116 and a data storage module 117, as well as any other rules, policies, modules, databases, or applications, as is necessary and/or desired. The ESM module 115 may be configured to facilitate monitoring synthetically one or more work flows and further to determine one or more types of parameters associated with the applications executed in the work flow. It may also perform correlation of the analytics data and performance data associated with the one or more types of parameters.

Figure 4:
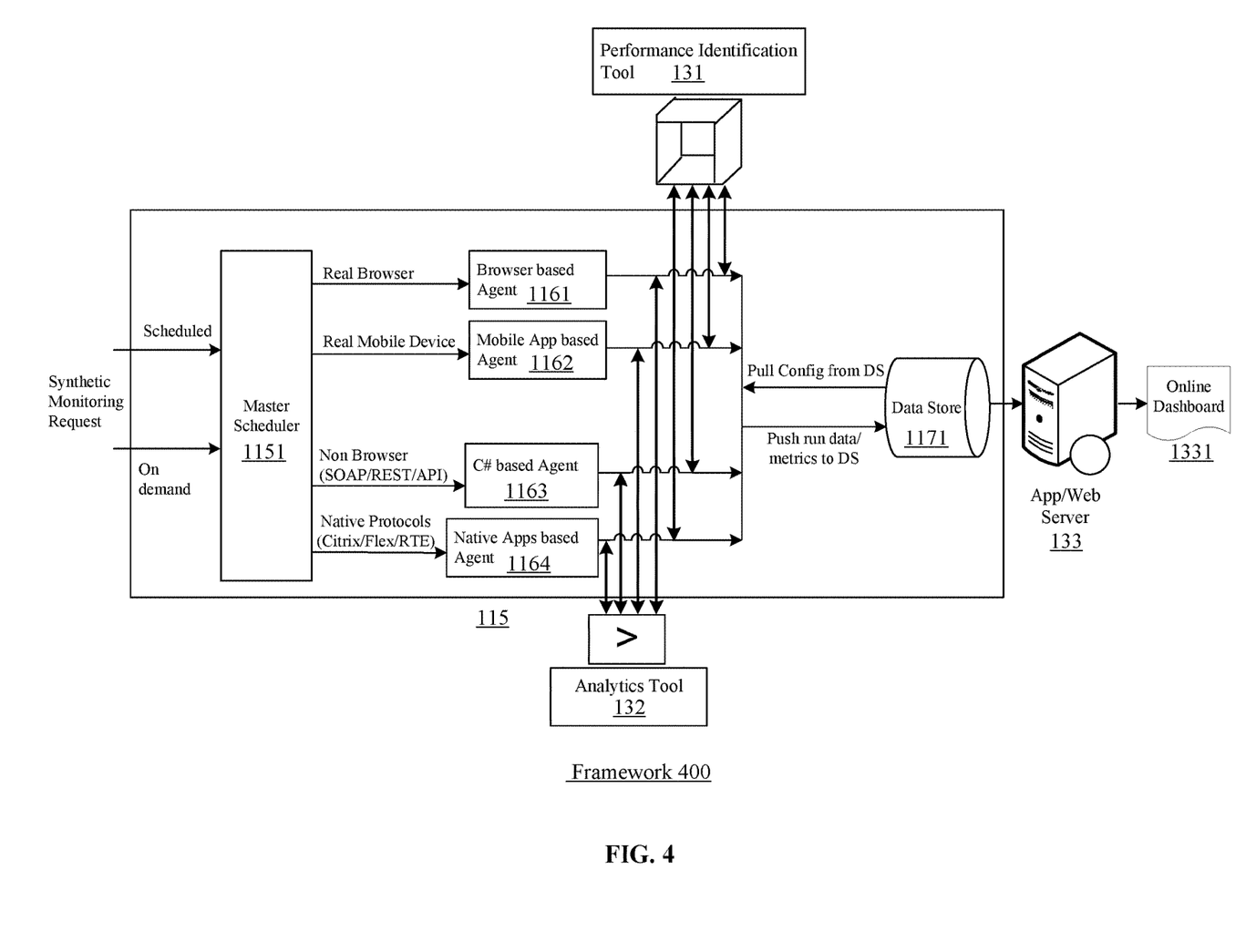
FIG. 4 illustrates an exemplary enterprise synthetic monitoring framework according to an embodiment of the present invention.

With reference to FIG. 4, an enterprise synthetic monitoring framework 400 can include the ESM module 115 as well as a number of other components. For example, the ESM module 115 may include or call a master scheduler 1151. Further, the agent modules 116 may include, by way of example, a browser-based agent 1161, mobile application based agent 1162, C# based agents (e.g., non-browser-based agent) 1163, and native applications based agents 1164. Even further, the data storage module 117 may include, by way of example, a data store 1171 that stores the data received from the agent modules 116 and the ESM module 115, as well as other types and formats of data.

The communication interface of the ESM module device 115 may operatively couple and communicate with the server devices 130 and/or the client devices 105 via the communication network(s) 121 and 122, although other types and/or numbers of communication networks or systems with other types and/or numbers of connections and/or configurations to other devices and/or elements can also be used.

By way of example only, the communication network(s) 121 and 122 may include local area network(s) (LAN(s)) or wide area network(s) (WAN(s)), and can use TCP/IP over Ethernet and industry-standard protocols, although other types and/or numbers of protocols and/or communication networks can be used. The communication network(s) 121 and 122 in this example can employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like.

Each of the server devices 130 may include one or more processors, a memory, and a communication interface, which are coupled together by a bus or other communication link, although other numbers and/or types of network devices could be used. The server devices 130 in this example process requests received from the ESM module 115 via the communication network(s) 122 according to the HTTP-based and/or JavaScript Object Notation (JSON) protocol, for example, although other protocols can also be used.

The server devices 130 may be hardware or software or may represent a system with multiple servers in a pool, which may include internal or external networks. The server devices 130 may host databases that are configured to store data associated with one or more applications which may include, by way of example, analytics data associated with one or more applications, performance data associated with one or more applications, correlation of the analytics data and the performance data.

Although the server devices 130 are illustrated as single devices, one or more actions of each of the server devices 130 may be distributed across one or more distinct network computing devices that together comprise one or more of the server devices 130. Moreover, the server devices 130 are not limited to a particular configuration. Thus, the server devices 130 may contain a plurality of network computing devices that operate using a master/slave approach, whereby one of the network computing devices of the server devices operate to manage and/or otherwise coordinate operations of the other network computing devices. With reference to FIG. 4, the server devices 130 may include the performance identification tool 131, analytics tool 132, app/web server 133, etc.

The server devices 130 may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also possible.

The client devices 105 may include any type of computing device that can facilitate the generation of price quote requests, such as in response to user interaction with graphical user interfaces for example. Accordingly, the client devices 105 may be mobile computing devices, desktop computing devices, laptop computing devices, tablet computing devices, virtual machines (including cloud-based computers), or the like, that host chat, e-mail, or voice-to-text applications, for example. Each of the client devices 105 in this example includes a processor, a memory, and a communication interface, which are coupled together by a bus or other communication link, although other numbers and/or types of network devices could be used.

The client devices 105 may run interface applications, such as standard web browsers or standalone client applications, which may provide an interface to communicate with the ESM module 115 via the communication network(s) 121 in order to communicate user requests. The client devices may further include a display device, such as a display screen or touchscreen, and/or an input device, such as a keyboard.

Although the exemplary network environment with the ESM module 115, server devices 130, client devices 105, and communication network(s) 121 and 122 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment, such as the ESM module 115, client devices 105, or server devices 130, for example, may be configured to operate as virtual instances on the same physical machine. In other words, one or more of the ESM module 115, client devices 105, or server devices 130 may be executed by the same physical device rather than as separate devices communicating through communication network(s). Additionally, there may be more or fewer ESM modules 115, client devices 105, or server devices 130 than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 5:
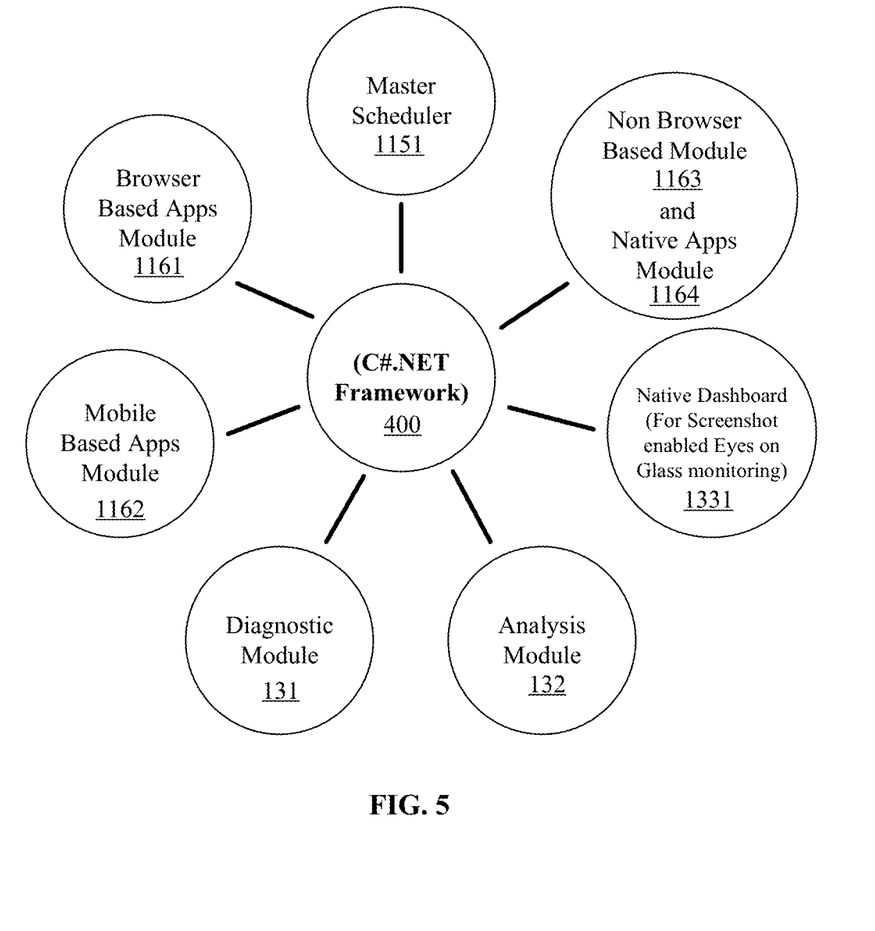
FIG. 5 illustrates exemplary enterprise synthetic monitoring framework components according to an embodiment of the present invention.

With reference to FIG. 5, the enterprise synthetic monitoring framework 400 can include the following exemplary components: the master scheduler 1151, the non-browser-based module 1163, the native applications module 1164, the dashboard 1331, the analysis module 132, the diagnostics module 131, the mobile application based agent 1162, and the browser based application module 1161.

Figure 6:
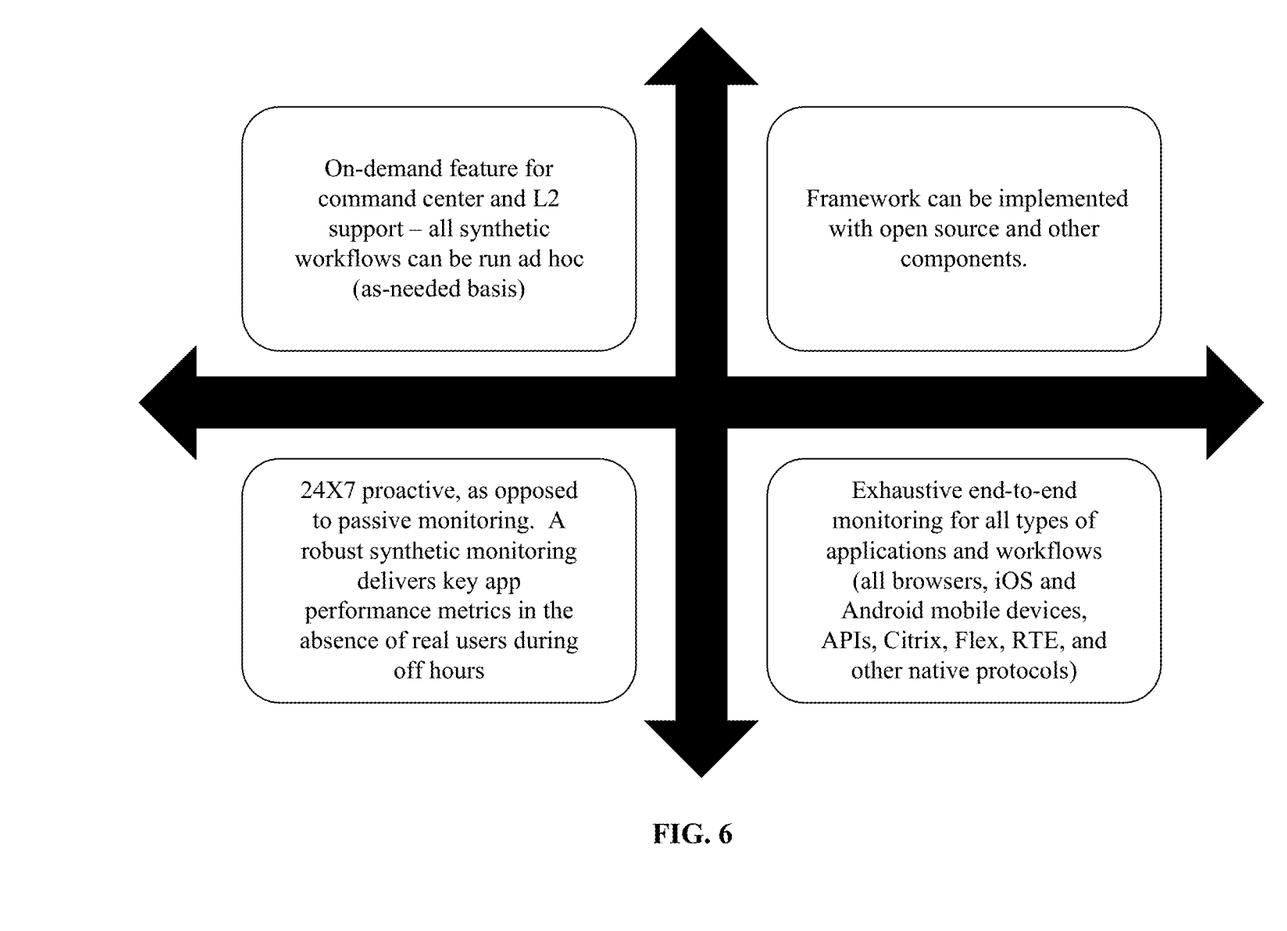
FIG. 6 illustrates exemplary features associated with the enterprise synthetic monitoring framework according to an embodiment of the present invention.

With reference to FIG. 6, the enterprise synthetic monitoring framework 400 can provide the following features and advantages: (i) an on-demand feature for command center and L2 support, allowing for all synthetic workflows to be run ad hoc, (ii) the framework 400 can be implemented with open source components, (iii) the framework 400 implements pro-active (as opposed to passive) monitoring twenty-four hours a day, seven days a week, allowing for a robust synthetic monitoring which delivers key application performance metrics in the absence of real users during off hours, and (iv) an exhaustive end-to-end monitoring for all types of applications and workflows (e.g., all browsers, iOS and Android mobile devices, APIs, Citrix, Flex, RTE, and other native protocols).

Figure 3:
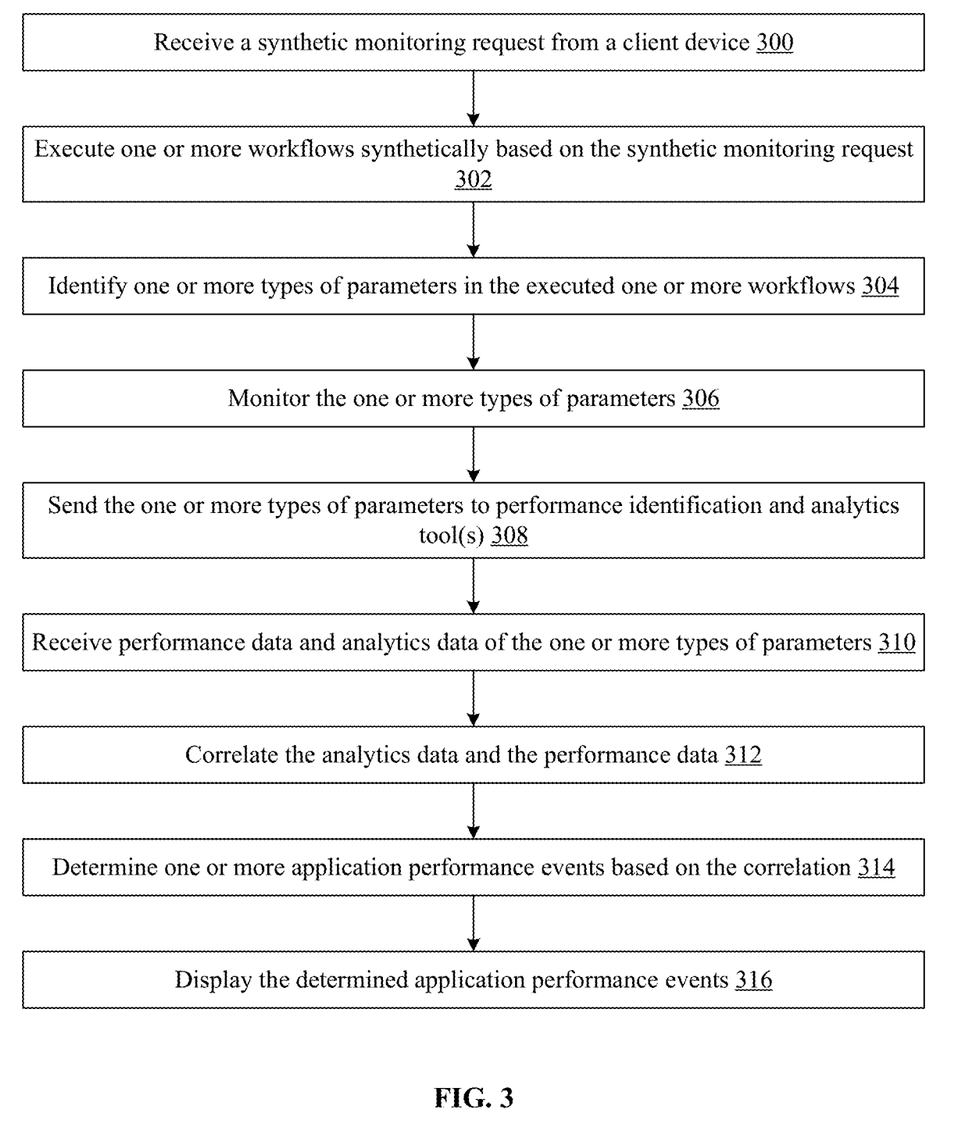
FIG. 3 illustrates an exemplary method of providing an enterprise synthetic monitoring framework according to an embodiment of the present invention.

An exemplary method of providing an enterprise synthetic monitoring framework 400 will now be described with reference to FIGS. 1-8. Referring more specifically to FIG. 3, in step 300 in this example, the ESM module 115 may receive a synthetic monitoring request from a client device 105. A system administrator may use one of the client devices 105 to generate one or more synthetic monitoring requests. The synthetic monitoring request may include a request that executes workflows associated with software applications. The synthetic monitoring requests may be, for example, a scheduled synthetic monitoring request and/or an on-demand synthetic monitoring request, although various other types of requests can also be generated. The scheduled synthetic monitoring request may be a request which schedules an execution of a workflow at a set time period on a periodic basis. The system administrator may schedule the request by selecting a time period at which one or more associated applications are to be executed, although other manners for obtaining the time period can be used. The scheduled synthetic monitoring request can be set by the system administrator to execute workflows associated with certain applications periodically. Further, an on-demand synthetic monitoring request may be a request that executes workflows in association with one or more applications in real time whenever the system administrator prefers to generate it. The on-demand synthetic monitoring request may not require a set time period to be provided in advance to generate the request.

In step 302, upon receiving the synthetic monitoring request, the ESM module 115 may execute one or more workflows synthetically based on the received synthetic monitoring request. The execution of the one or more workflows synthetically may include mirroring or mimicking of the steps performed by a user at one of the client devices 105 to access a particular application over a browser interface. For example, a first step that a user at one of the client devices 105 may perform is to open an application. Next, the user at one of the client devices 105 may enter its login credentials to access the application. Next, the user at one of the client devices may click on various buttons of the browser interface to perform various functions associated with various applications.

These various steps described above may be mimicked by the ESM module 115 to be replicated and performed automatically without any actual user association. The process of mimicking the user steps performed by the ESM module 115 for an application may be defined as a "workflow." This process of mimicking may be performed for various applications to form one or more workflows. The mimicking of the user steps by the ESM module 115 may help in monitoring the availability and performance of the various applications in the actual production environment as well as during testing phase of a software development cycle. This provides the advantage of being able to monitor the application even in the absence of any real user in the production environment (off hours/weekends) and further detecting and solving problems, such as application malfunctions, performance issues, coding issues and/or coding errors associated with the application before the end user faces these problems.

Synthetic monitoring may be equivalent to performing a combined automated functional and performance testing in production. It can detect user experience issues (performance or failures) in live production and is independent of real users in the system.

In step 302, when a scheduled synthetic monitoring request may be received by the ESM module 115, the ESM module 115 may obtain a set time period associated with each of the one or more applications included in the request to execute the one or more workflows associated with each of the one or more applications at the set time period. Accordingly, at the set time period for each of the one or more applications the ESM module 115 executes the one or more workflows. In addition, if an on-demand synthetic monitoring request is received by the ESM module 115, the ESM module 115 may determine the one or more applications included in the request and execute one or more workflows associated with the one or more applications in real time upon receiving the on-demand synthetic monitoring request.

In step 304, the ESM module 115 may identify one or more types of parameters in the executed one or more workflows. The one or more types of parameters may include, by way of example, the types of application being executed. The types of applications may include, by way of example, real browser applications, real mobile device applications, non-browser-based applications, native applications, etc. The real browser applications may include any application that may be executed on a browser interface of a client device. The real mobile device applications may include, for example, any application that may be executed on a mobile device. The non-browser applications may include, for example, applications that do not require a browser interface of a client device and may include applications that utilize Simple Object Access Protocol (SOAP Protocol), Representational state transfer (REST) Protocol, and/or application programming interface (API) protocol. The native applications may include applications that run native to the user device and utilize communication protocols such as independent computing architecture (ICA) protocol, Flex protocol and RTE protocols.

In step 306, the ESM module 115 may monitor the identified one or more types of parameters. The ESM module 115 may utilize various agents to monitor the identified one or more types of parameters. The various agents may include, browser based agent 1161, mobile application based agent 1162, C# based agent 1163, native applications based agent 1164; although other types of agents that monitor the workflows may also be used. The browser based agent 1161 monitors real browser applications. The mobile application based agent 1162 monitors real mobile device applications. The C# based agent 1163 monitors non-browser-based applications. The native application based agent 1164 monitors native applications.

In step 308, the ESM module 115 may send the monitored one or more types of parameters to one or more performance identification and analytics tools 131 and 132, respectively. The various agents that monitor the one or more types of parameters transmit the monitored data to the performance identification and analytics tools 131 and 132. The performance identification and analytics tools 131 and 132 identify the performance data associated with each of the one or more types of parameters and sends the identified performance data back to the ESM module 115. The performance data may include, auto-dependency detection, anomalies in baseline application performance, root cause analysis, software code errors. The auto-dependency detection may include detecting all dependencies in services, processes, containers, hosts, infrastructure, network, and the cloud. The anomalies in baseline application performance may include detecting anomalies in real-time application performance metrics when baseline performance of applications is not met. The root cause analysis may include identification of software code issues or application performance issues that reduce the application performance which helps to focus on correcting problems before they impact your customers. The software code errors may include identifying issues in Java code, .NET code that causes performance issues, although any other forms of performance data may also be included.

The performance identification and analytics tools 131 and 132 may also identify analytics data associated with each of the one or more types of parameters and send the identified performance data back to the ESM module 115. The performance identification tool 131, by way of example, may include Dynatrace. The analytics tool 132, by way of example, may include Splunk. The analytics data may include, indexing of the monitored data, application logs associated with the one or more applications being monitored, generating reports of application memory usage, generating real time alerts as visual representations of the monitored data, although any other forms of analytics data may be included.

In step 310, the ESM module 115 receives performance data of the identified one or more types of parameters and the analytics data of the identified one or more types of parameters from the performance identification and analytics tools 131 and 132.

In step 312, the ESM module 115 may correlate the received analytics data and the performance data. The ESM module 115 correlates, for example, the alerts data from the analytics data with the anomalies in baseline application performance from the performance data to determine displaying alerts to a user interface explained in detail in step 314.

In step 314, the ESM module 115 may determine one or more application performance events based on the correlation. The ESM module 115 may determine one or more application performance events based on the correlation and association of the received analytics data and performance data. In this example, the ESM module 115 may correlate the alerts data from the analytics data with the anomalies in baseline application performance from the performance data and displays alerts to a user interface based on determining that the application performance anomalies is an application performance event which requires an alert to be sent out to the user based on correlation rules stored in a data store.

Figure 7:
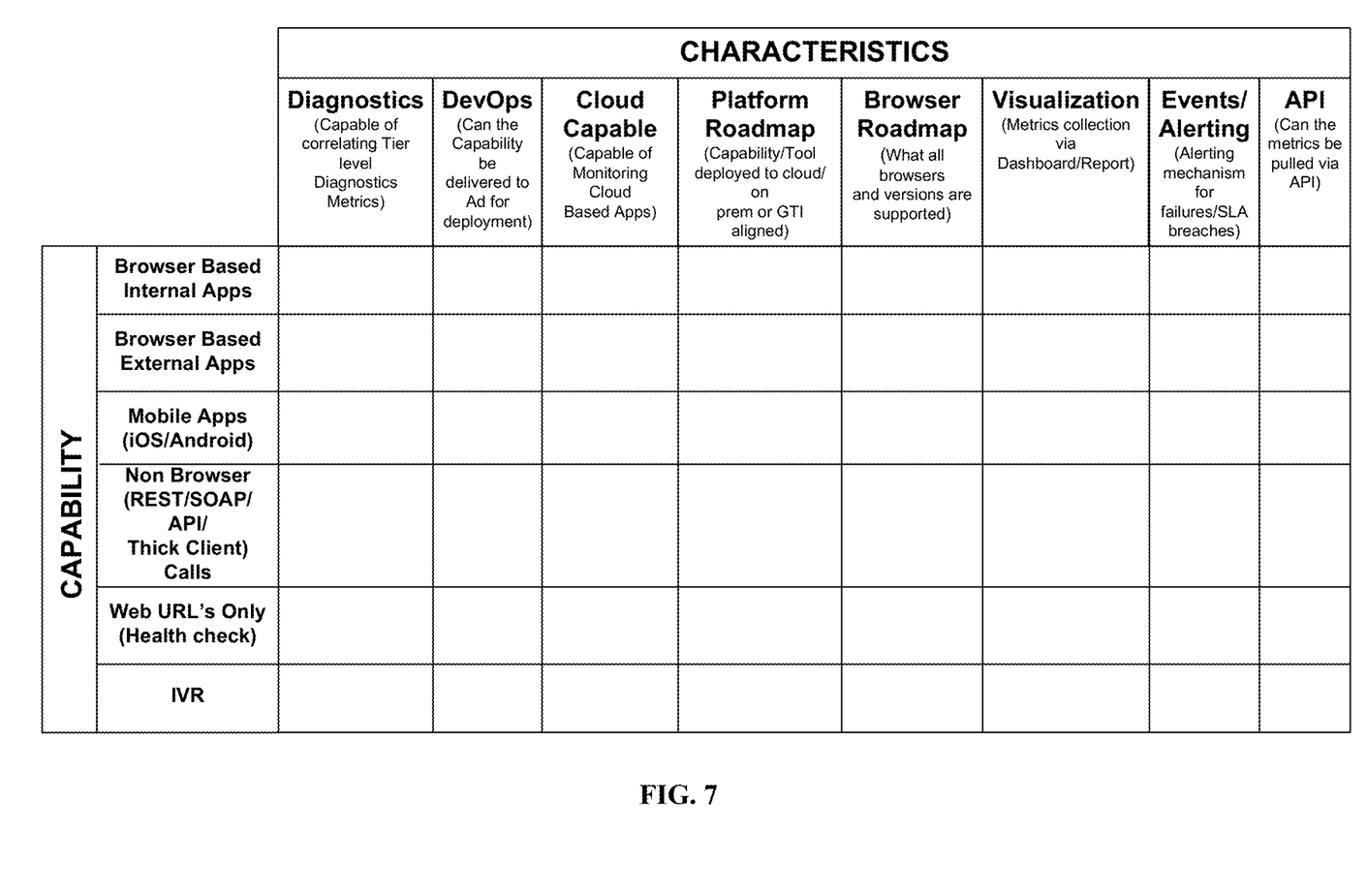
FIG. 7 illustrates an exemplary capability-characteristics matrix for the enterprise synthetic monitoring framework according to an embodiment of the present invention.

With reference to FIG. 7, the ESM module 115 is capable of monitoring browser-based internal and/or external applications, mobile applications, non-browser-based calls (e.g., REST/SOAP/API/Thick Client), web URL health checks, and interactive voice response (IVR) checks (e.g., max calls per day, max calls per minute, average calls count, etc.), which can be fetched from the API. According to an embodiment, these capabilities can be based on variety of different characteristics, such as diagnostics (e.g., is it capable of correlating tier-level diagnostics metrics?), DevOps (e.g., provides a development team the capability to perform their own monitoring with the ESM module 115 based on the application and type of monitoring required), cloud capable (e.g., is it capable of monitoring cloud-based applications), platform roadmap (e.g., is the capability/tool deployed to the cloud, servers on premises, or other infrastructure?), browser roadmap (e.g., which browsers and versions are supported), visualization (e.g., metrics collected via dashboard/report), API, and events/alerting. Further, according to an embodiment, the diagnostic metrics may indicate issues and/or errors that cause a certain performance degradation. In addition, the diagnostic metrics can also provide options for repairing the indicated issues and/or errors. Further, the browser roadmap may indicate the types of browsers as well as the version of the browsers supported.

With reference to FIG. 8, the one or more application performance events may include, for example, failure alerts of an application, success alerts of an application, amount of time consumed by an application during a run, diagnostics metrics, a browser roadmap, etc. The failure alerts of the application may indicate when an application has stopped working and/or has failed. For example, as depicted in the figure, a failure alert may be indicated by an X mark. The success alert of the application may indicate when an application is working correctly. For example, as depicted in the figure, a success alert may be indicated by a check mark. The amount of time consumed by an application during a run may indicate the start time, the end time, and the total duration of time required to complete a task during a scheduled run or an on-demand run. According to an embodiment, the start time, the end time, and the total duration can be presented in respective columns in the exemplary user interface of FIG. 8, e.g., "Start Time," "End Time," and "Duration." The browser roadmap may indicate the types of browsers and the version of the browsers supported. Further, as depicted in the figure, the exemplary user interface also displays the scheduled and on-demand runs.

In step 316, the ESM module 115 may cause the determined application performance events to be displayed by a user interface. An exemplary user interface is shown in FIG. 8.

In embodiments, synthetic monitoring of multiple metrics is provided together in a unified framework. This provides further advantages of cross platform integration to present one single interface that provides access to multiple application metrics instantly. They further provide the advantages of detecting and correcting user environment application performance problems before the end user comes across with these and other problems. Additionally, this embodiments facilitate more efficient monitoring of application performance that improves the overall network efficiency.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for providing an enterprise synthetic monitoring framework, the system comprising:
   a client device, including a processor, memory, and a communication interface, configured to generate one or more synthetic monitoring requests;
   an information processing apparatus, including at least one computer processor, wherein the information processing apparatus is configured to
      receive, on a single framework supported by the information processing apparatus, a first synthetic monitoring request from the client device, the first synthetic monitoring request being for a real browser application;
      receive, on the single framework, a second synthetic monitoring request from the client device, the second synthetic monitoring request being for a real mobile device application;
      receive, on the single framework, a third synthetic monitoring request from the client device, the third synthetic monitoring request being for a non-browser based application;
      receive, on the single framework, a fourth synthetic monitoring request from the client device, the fourth synthetic monitoring request being for a native application;
      execute, on the single framework, a plurality of workflows of differing application types synthetically on a plurality of environments, including a production environment, based on the received first, second, third and fourth synthetic monitoring requests, the execution of the plurality of workflows synthetically including replicating one or more operations performed by a user at the client device to access a target application over a browser interface by inputting of user credentials and to perform various functions associated with various applications over a network, the differing application types including each of the real mobile device application, the real browser application, the non-browser based application, and the native application;
      identify one or more types of parameters in the executed plurality of workflows;
      monitor the identified one or more types of parameters;
      send the monitored one or more types of parameters to one or more performance identification and analytics tools;
      receive analytics data and performance data associated with the monitored one or more types of parameters from the one or more performance identification and analytics tools;
      correlate the received analytics data and performance data; and
      determine one or more application performance events based on the correlation; and
   one or more server devices, including one or more processors, memory, and a communication interface, configured to implement the one or more performance identification and analytics tools,
   wherein the one or more types of parameters include types of executable applications being executed, the types of executable applications including the real browser application, the real mobile device application, the non-browser based application, and the native application.

2. The system of claim 1,
   wherein the received one or more synthetic monitoring requests includes at least one of a scheduled synthetic monitoring request and an on-demand synthetic monitoring request, and
   wherein (i) the scheduled synthetic monitoring request schedules an execution of the plurality of workflows at a set time period on a periodic basis, and (ii) the on-demand synthetic monitoring request requests that the plurality of workflows are executed in real-time.

3. The system of claim 1,
   wherein the identified one or more types of parameters are monitored by a corresponding monitoring agent, and
   wherein the monitoring agent is at least one of a browser agent, a mobile application agent, a C# agent, and a native applications agent.

4. The system of claim 1,
   wherein the analytics data includes at least one of indexing monitored data, application logs associated with one or more applications being monitored, generating reports of application memory usage, and generating real-time alerts as visual representations of the monitored data.

5. The system of claim 1,
   wherein the performance data includes at least one of auto-dependency detection, anomalies in baseline application performance, root cause analysis, and software code errors.

6. The system of claim 1,
   wherein the one or more application performance events include at least one of failure alerts of an application, success alerts of the application, amount of time consumed by the application during a run, diagnostics metrics, and a browser roadmap.

7. The system of claim 6,
   wherein (i) the failure alerts of the application indicate when the application has stopped working or has failed, (ii) the success alerts of the application indicate when the application is working correctly, (iii) the amount of time consumed by the application during the run indicates a start time, an end time and a total duration of time required to complete a task during a scheduled run or an on-demand run, (iv) the diagnostic metrics indicate issues or errors that cause a performance degradation, and (v) the browser roadmap indicates types of browsers and versions of the browsers supported.

8. A method for providing an enterprise synthetic monitoring framework in an information processing apparatus including at least one computer processor, the method comprising:
   receiving, one a single framework supported by the information processing apparatus, a first synthetic monitoring request from a client device, the first synthetic monitoring request being for a real browser application;

receiving, on the single framework, a second synthetic monitoring request from the client device, the second synthetic monitoring request being for a real mobile device application;

receiving, on the single framework, a third synthetic monitoring request from the client device, the third synthetic monitoring request being for a non-browser based application;

receiving, on the single framework, a fourth synthetic monitoring request from the client device, the fourth synthetic monitoring request being for a native application;

executing, on the single framework, a plurality of workflows of differing application types synthetically on a plurality of environments, including a production environment, based on the received first, second, third and fourth synthetic monitoring requests, the execution of the plurality of workflows synthetically including replicating operations performed by a user at the client device to access a target application over a browser interface by inputting of user credentials and to perform various functions associated with various applications over a network, the differing application types including each of the real mobile device application, the real browser application, the non-browser based application, and the native application;

identifying one or more types of parameters in the executed plurality of workflows;

monitoring the identified one or more types of parameters;

sending the monitored one or more types of parameters to one or more performance identification and analytics tools;

receiving analytics data and performance data associated with the monitored one or more types of parameters from the one or more performance identification and analytics tools;

correlating the received analytics data and performance data; and determining one or more application performance events based on the correlation, wherein the one or more types of parameters include types of executable applications being executed, the types of executable applications including the real browser application, the real mobile device application, the non-browser based application, and the native application.

9. The method of claim 8,
wherein the received one or more synthetic monitoring requests includes at least one of a scheduled synthetic monitoring request and an on demand synthetic monitoring request, and
wherein (i) the scheduled synthetic monitoring request schedules an execution of the plurality of workflows at a set time period on a periodic basis and (ii) the on-demand synthetic monitoring request requests that the plurality of workflows are executed in real-time.

10. The method of claim 8,
wherein the identified one or more types of parameters are monitored by a corresponding monitoring agent, and
wherein the monitoring agent is at least one of a browser agent, a mobile application agent, a C# agent, and a native applications agent.

11. The method of claim 8,
wherein the analytics data includes at least one of indexing monitored data, application logs associated with one or more applications being monitored, generating reports of application memory usage, and generating real-time alerts as visual representations of the monitored data.

12. The method of claim 8,
wherein the performance data includes at least one of auto-dependency detection, anomalies in baseline application performance, root cause analysis, and software code errors.

13. The method of claim 8,
wherein the one or more application performance events include at least one of failure alerts of an application, success alerts of the application, amount of time consumed by the application during a run, diagnostics metrics, and a browser roadmap.

14. The method of claim 13,
wherein (i) the failure alerts of the application indicate when the application has stopped working or has failed, (ii) the success alerts of the application indicate when the application is working correctly, (iii) the amount of time consumed by the application during the run indicates a start time, an end time and a total duration of time required to complete a task during a scheduled run or an on-demand run, (iv) the diagnostic metrics indicate issues or errors that cause a performance degradation, and (v) the browser roadmap indicates types of browsers and versions of the browsers supported.

15. A system for providing an enterprise synthetic monitoring framework, the system comprising:
an information processing apparatus comprising at least one computer processor, wherein the information processing apparatus is configured to
receive, on a single framework supported by the information processing apparatus, a first synthetic monitoring request from a client device, the first synthetic monitoring request being for a real browser application;
receive, on the single framework, a second synthetic monitoring request from the client device, the second synthetic monitoring request being for a real mobile device application;
receive, on the single framework, a third synthetic monitoring request from the client device, the third synthetic monitoring request being for a non-browser based application;
receive, on the single framework, a fourth synthetic monitoring request from the client device, the fourth synthetic monitoring request being for a native application;
execute, on the single framework, a plurality of workflows of differing application types synthetically on a plurality of environments, including a production environment, based on the received first, second, third and fourth synthetic monitoring requests, the execution of the plurality of workflows synthetically comprising replicating steps performed by a user at the client device to access a target application over a browser interface by inputting of user credentials and to perform various functions associated with various applications over a network, the differing application types including each of the real mobile device application, the real browser application, the non-browser based application, and the native application;
identify one or more types of parameters in the executed plurality of workflows;
monitor the identified one or more types of parameters;

send the monitored one or more types of parameters to one or more performance identification and analytics tools;

receive analytics data and performance data associated with the monitored one or more types of parameters from the one or more performance identification and analytics tools;

correlate the received analytics data and performance data; and determine one or more application performance events based on the correlation, wherein the one or more types of parameters include types of executable applications being executed, the types of executable applications including the real browser application, the real mobile device application, the non-browser based application, and the native application.

\* \* \* \* \*